Oct. 29, 1940. R. E. VOLLRATH Re. 21,613
LUMINOUS ELECTRICAL DISCHARGE DEVICE
Original Filed July 22, 1930
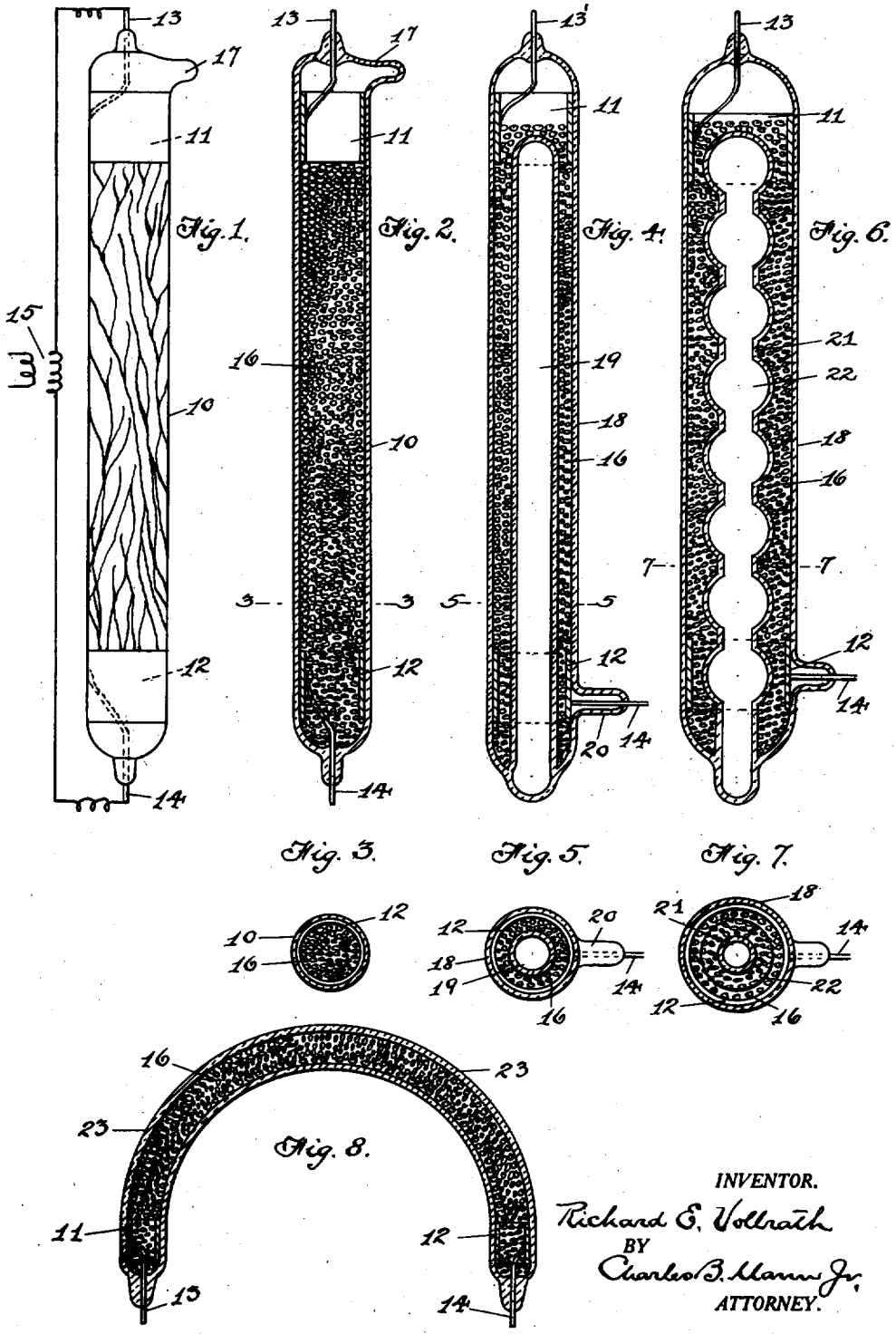
INVENTOR.
Richard E. Vollrath
BY
Charles B. Mann Jr.
ATTORNEY.

Reissued Oct. 29, 1940 Re. 21,613

UNITED STATES PATENT OFFICE 21,613

LUMINOUS ELECTRICAL DISCHARGE DEVICE

Richard E. Vollrath, San Marino, Calif.

Original No. 1,851,532, dated March 29, 1932, Serial No. 469,787, July 22, 1930. Application for reissue June 26, 1936, Serial No. 87,594

6 Claims. (Cl. 176—14)

This invention relates to improvements in electrical discharge devices and more particularly to luminous gas-filled electrical discharge devices and has for its main object to provide a device of this character in which the discharge presents the appearance of moving luminous veins or filaments.

It is well known that a luminous electrical discharge can be produced in a rarefied gas contained in a discharge-tube by applying a sufficiently high voltage to the electrodes.

When this type of electrical discharge through a gas is employed in luminous signs now in extensive use, the gas pressure in the tube is usually adjusted to give a uniform steady glow which fills the tube.

I have found that electrical discharges through gases, that are confined in a transparent container, may be altered in a striking manner, when such container is filled with granules or dielectric and insulating material such as glass or quartz.

The invention is illustrated in the accompanying drawing, wherein:

Fig. 1 shows a luminous tubular discharge device in side elevation, in which my invention is embodied.

Fig. 2 illustrates the same in vertical longitudinal section.

Fig. 3 shows a cross-sectional detail through the same, the section being taken on the line 3—3 of Fig. 2.

Fig. 4 illustrates the invention in a slightly modified form of tube.

Fig. 5 shows a cross-sectional detail through the same as viewed on the line 5—5 of Fig. 4.

Fig. 6 illustrates another embodiment of the invention.

Fig. 7 shows a cross-sectional detail through the same as viewed on the line 7—7 of Fig. 6, and Fig. 8 illustrates another shape of tube in which my invention is embodied.

Referring particularly to Figs. 1, 2 and 3 the numeral 10 designates a transparent container, which in the present instance has the form of a cylindrical glass tube, provided on the interior thereof, near each of its opposite ends, with electrodes 11 and 12 and suitable lead wires 13 and 14 whose inner ends are connected to said electrodes. These lead-wires are sealed into the tubes vacuum-tight and serve to connect the electrodes with a current-supply through a suitable transformer 15.

The tube 10 is practically filled with dielectric or insulating material in the form of granules 16.

These granules or particles with which the tube is filled may be composed of quartz, glass, or any insulating material which is not destroyed under the influence of the electrical discharge, and they may be of any geometrical shape with either smooth or irregular surfaces. If glass or some other insulating ceramic material is employed, it may have the form of beads or of fragments obtained by crushing larger pieces of the material.

Colored granules may be employed if desired to produce different effects.

One of the most advantageous materials, from a cost point of view, is pure quartz sand, known as Ottawa sand, which may be obtained in a variety of sizes with almost spherical grains. The rounded form of these grains is of some advantage because it allows the sand to readily flow into bent tubes during the process of manufacture and this particular quartz sand has low absorptive power for gases. This is important in case the gas to be employed is one of the rare gases of atmosphere, such as neon, whose luminous properties are extremely sensitive to any gaseous impurities which might escape from inadequately-outgassed granules during the operation of the tube.

The tube containing the granules is evacuated, then filled with a gas at reduced pressure and finally sealed, the teat 17 indicating the point at which these operations take place.

All of these operations are well known to those familiar with the manufacture of discharge tubes and therefore form no part of the present invention.

The kind of gas employed may also be varied, as it is known that neon gas will produce a different colored effect from that which helium gas will produce so that various colored effects may be produced according to the nature of the gas employed.

By the use of granules as a filler, the free gas spaces existing between the granules constitute a large number of tortuous channels or paths through which the discharge might pass. In practice, however, the discharge apparently follows only a few of the numerous available channels so that instead of all the channels and spaces between the granules being filled with a uniform steady glow, a smaller number of tortuous and brilliantly luminous veins or filaments appear.

The discharge passes most readily along the inner surface of the transparent discharge-tube and follows an extremely crooked or zig-zag path through the spaces between the granules lying near this wall surface or in contact with it substantially as shown by zig-zag lines in Fig. 1.

I have found that this discharge takes place most readily when the electrodes 11 and 12 are in close contact with the surface along which the discharge is to take place, and for this reason I have arranged the electrodes in close contact with the wall of the tube, as clearly shown in the drawing.

A most curious and striking property of the discharge is that it does not follow the same channels persistently, but frequently shifts from one set or group of channels to another, thus giving the luminous veins the appearance of moving about erratically. The effect produced is therefore likened to a rapid sequence of brilliant lightning flashes within the tube and presents the appearance of motion which is most effective in advertising displays in attracting attention.

The effect is thus produced without resorting to the use of any switching or mechanical devices to produce the appearance of motion.

A lighter construction of discharge-tube may be gained by means of the structure shown in Figs. 4 and 5, wherein, 18 designates an outer transparent glass tube in which there is formed or located an inner central tube 19.

The same electrodes 11 and 12 may be used at opposite ends of the tube, and a lead wire 13 may enter the tube at one end and be attached to the electrode 11. At the opposite end, the tube 18 may have a lateral nipple 20 through which a lead wire 14 to the other electrode 12 may be passed.

The filler 16 will then be confined in the space between the outer and inner tubes so that the inner tube will displace the heavier quartz filler and therefore produce a lighter structure.

The manner of forming the inner and outer tubes is of no importance.

There is a tendency with this straight wall type of inner tube for some of the discharge to run along the outer wall of the inner tube where it cannot be readily seen, owing to the interposition of the granules between the tubes, and I find that the effect is prevented by providing an inner tube 21, of an irregular shape with a series of annular enlargements 22 as shown in Figs. 6 and 7. In this form the path along the central tube is long, due to the enlargements, and therefore the discharge will follow the shorter path along the inner wall of the container. The distance between the inner and outer tube of Figs. 4 and 5 may be made so small as to permit the interposition of only one layer of granules. In this case, discharge along the inner tube are equally as visible as those along the inner wall of the container.

In Fig. 8, the structures are substantially the same as those in Figs. 1 and 2 with the exception that the tube 23 is of a semi-circular shape.

Having described my invention, I claim:

1. An electric discharge device comprising a sealed transparent container having a gas therein, electrodes having terminals within the container and a granular filler in the gas-filled container the granules of which form numerous channels between the electrodes for the passage of the discharge between the electrodes.

2. An electric discharge device comprising a transparent outer container with gas therein, an inner displacing element in said container, electrodes having terminals exposed in the space between said outer container and the said inner element and a filler of granular insulating material in said space between said electrodes.

3. An electric discharge device comprising a transparent container having gas therein, spaced electrodes in the container and in contact with the inner wall thereof and a granular filler in the container between said electrodes said filler forming numerous channels for the passage of discharge between the electrodes and producing the effect of moving luminous veins in the container.

4. An electric discharge device comprising a transparent outer tube with a gas therein, an inner tube spaced from the outer tube, a granular filler in said space between the outer and inner tubes and spaced electrodes in the outer tube.

5. An electric discharge device comprising a transparent outer tube with a gas therein, an inner tube spaced from the outer tube, said inner tube having enlargements at spaced intervals, spaced electrodes in the space between the outer and inner tubes and a granular filler in said space between said electrodes.

6. A luminous electric discharge device comprising a closed glass tube containing a rare gas and having an electrode at each end, and a filler in the tube between said electrodes composed of granules of insulating material of substantially bead-like form to provide spaces around the granules for the movement of the gas and affording tortuous electrical discharge passages through that part of the tube containing the filler.

RICHARD E. VOLLRATH.